United States Patent [19]

Zamma et al.

[11] 4,347,221

[45] Aug. 31, 1982

[54] CATALYTIC CONVERTER

[75] Inventors: Jun Zamma; Isao Makino, both of Chiba; Toshiyuki Mii, Funabashi; Kazumi Shima, Chiba, all of Japan

[73] Assignee: Toyo Engineering Corporation, Japan

[21] Appl. No.: 239,614

[22] Filed: Mar. 2, 1981

[30] Foreign Application Priority Data

Mar. 13, 1980 [JP] Japan ................................ 55-3092

[51] Int. Cl.³ .............................................. F28D 21/00
[52] U.S. Cl. .................................. 422/207; 208/48 Q
[58] Field of Search ...................... 422/207; 208/48 Q; 261/111; 196/126, 127

[56] References Cited

U.S. PATENT DOCUMENTS

| | | | |
|---|---|---|---|
| 3,235,344 | 2/1966 | Dreyer et al. | 422/207 X |
| 3,455,658 | 7/1969 | Wilkinson | 422/207 X |
| 3,682,241 | 8/1972 | Clauss et al. | 208/48 Q X |
| 3,694,169 | 9/1972 | Fawcett et al. | 422/207 X |
| 3,723,072 | 3/1973 | Carson et al. | 422/207 X |
| 4,094,937 | 6/1978 | Bodick et al. | 261/111 |
| 4,196,050 | 4/1980 | Takahashi et al. | 208/48 Q X |

FOREIGN PATENT DOCUMENTS 1105614 3/1968 United Kingdom ................ 422/207

Primary Examiner—Richard L. Chiesa
Attorney, Agent, or Firm—McGlew and Tuttle

[57] ABSTRACT

A catalytic converter is disclosed, which incorporates an improved mechanism to supply a part of a make-up gas for temperature control. A plurality of stages of a gas injection device are provided in the main body of the catalytic converter, each of the stages of the gas injection rings consisting of a plurality of gas injection rings concentrically arranged therein. Each of the gas injection rings is interconnected through connecting tubes to each of the small chambers which corresponds to each of the stages of the gas injection rings and is provided in a make-up gas supply chamber.

16 Claims, 2 Drawing Figures

CATALYTIC CONVERTER

BACKGROUND OF THE INVENTION

1. Field of the Invention

The present invention relates to a catalytic converter including an improved mechanism for feeding a part of the make-up gas to control the reaction temperature.

2. Description of the Prior Art

British Pat. No. 1,105,614 discloses a catalytic converter of the fixed bed type including intermediate fluid injection means therein, said intermediate fluid injection means each comprising a number of perforated hollow bars which incorporate spargers for fluid injection, wherein said hollow bars are large enough in cross section to constitute a fluid mixing zone and are arranged so close to each other or to the wall of a converter that a substantial portion of the reaction mixture is passed through the inside of the hollow bars. By using a converter of this type, the reaction temperature can easily be controlled to the required level.

A converter of this type, however, has the disadvantages as described hereunder. First of all, the fluid is fed to the perforated hollow bars through the nozzles (or inlet ports) provided on the side wall of the pressure-retaining shell or the lid of the reactor so that one nozzle is necessary for each of the perforated hollow bars in the case of feeding fluid through the side wall or a plurality of nozzles are necessary for each of the perforated hollow bars (C-shape or ring type) in order to assure uniform distribution of fluid therein in the case of feeding fluid through the lid.

As a plurality of perforated tubes must be installed in several stages in the direction of the reactant flow, a large number of nozzles are required to be provided on the side wall of the pressure-retaining shell or the lid. However, as a large-scale catalytic converter of this type imposed many restrictions in the design, fabrication, transportation and the like, of converter vessels, the converter vessel is desired to have as few nozzles as possible.

Second, support rings must be provided, which are welded onto the inside of the pressure-retaining shell of the converter, in order to support the perforated hollow bars to be disposed in parallel with proper clearance in a predetermined sectional space. A larger converter generally requires a thicker wall of its pressure-retaining shell, with the welding of support rings onto such a thicker wall possibly causing weld cracks on the wall. Furthermore, if the diameter of the reactor becomes larger, the perforated hollow bars become longer, rendering the length of the support span larger. This tends to necessitate an increase in the rigidity of the perforated hollow bars. It is possible to alleviate the situation by supporting the hollow bars with a plurality of beams being placed under and in the direction perpendicular to the hollow bars. However, this arrangement requires longer supporting beams which must have greater rigidity and consequently must be the bigger. The bigger size of the beams prevents reactants from flowing uniformly along the converter vessel axis. Furthermore, the supporting of the perforated hollow bars of C-shape or ring type requires a plurality of beams thereunder, which involves such disadvantages as described above.

Third, as the size of beams for supporting perforated hollow bars becomes larger, the effective space for reaction in a converter is reduced accordingly. In case the perforated hollow bars are C-shape or ring type, plurality a of connecting tubes must be installed for each set of the perforated hollow bars passing through the lid to the inside of a reactor, and thus the plurality of connecting tubes reduces the effective space for the reaction of the converter accordingly.

SUMMARY OF THE INVENTION

An object of the present invention is to provide a catalytic converter containing an improved mechanism for feeding a part of a make-up gas to control the reaction temperature, thereby eliminating the disadvantages heretofore described.

Another object of the invention is to provide a catalytic converter containing a mechanism which is suitable for a scaled-up catalytic converter.

A catalytic converter according to the present invention comprises: a main body having a gas inlet port, a gas outlet port and an opening for installing make-up gas supply conduits to feed a part of the make-up gas for the temperature control; a gas supply chamber which is installed in the center portion of the inside of said main body and closed at the one end thereof and connected at other end to said opening for installing make-up gas supply conduits; at least one stage of a gas injection device consisting of a plurality of gas injection rings which are arranged concentrically and perpendicularly to the direction of the gas flow, said gas injection rings incorporating gas sparging means; small chambers of a number equal to the number of the stages of said gas injection device arranged in the direction of the gas flow, said small chambers being constructed by dividing said gas supply chamber with partitions; connecting tubes which are installed inside said gas supply chamber and which interconnect each of said small chambers to each of said makeup gas supply conduits of a number equal to the number of said small chamber; and connecting tubes which interconnect each of said small chambers to each stage of said gas injection device.

DETAILED DESCRIPTION OF THE INVENTION

An embodiment of the present invention will now be described hereunder, with reference to the accompanying drawings.

Figure 1:
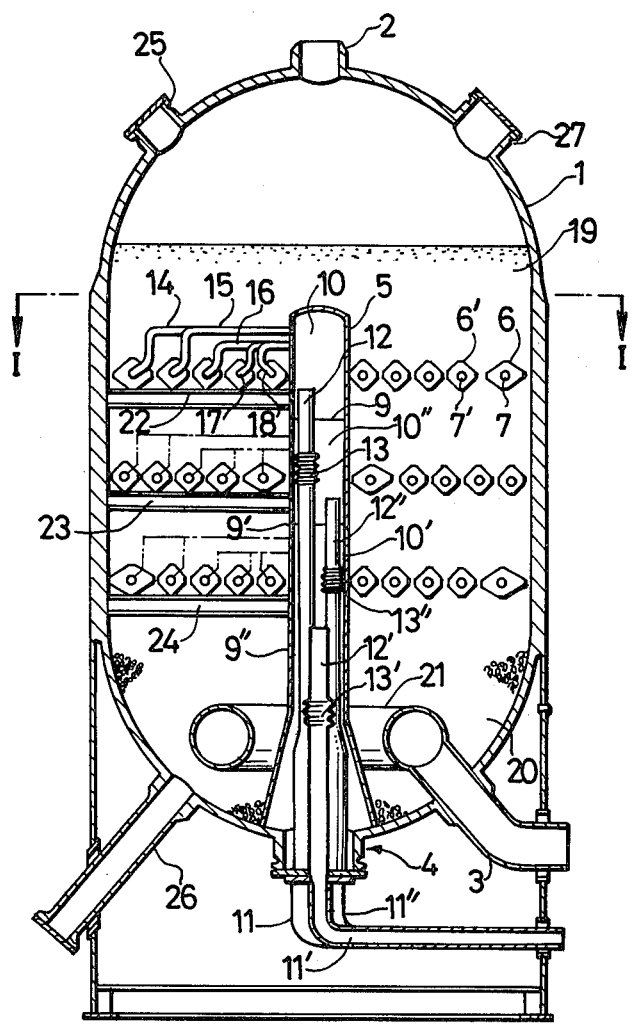
FIG. 1 is a view in vertical, longitudinal section of a catalytic converter according to the present invention.
Figure 2:
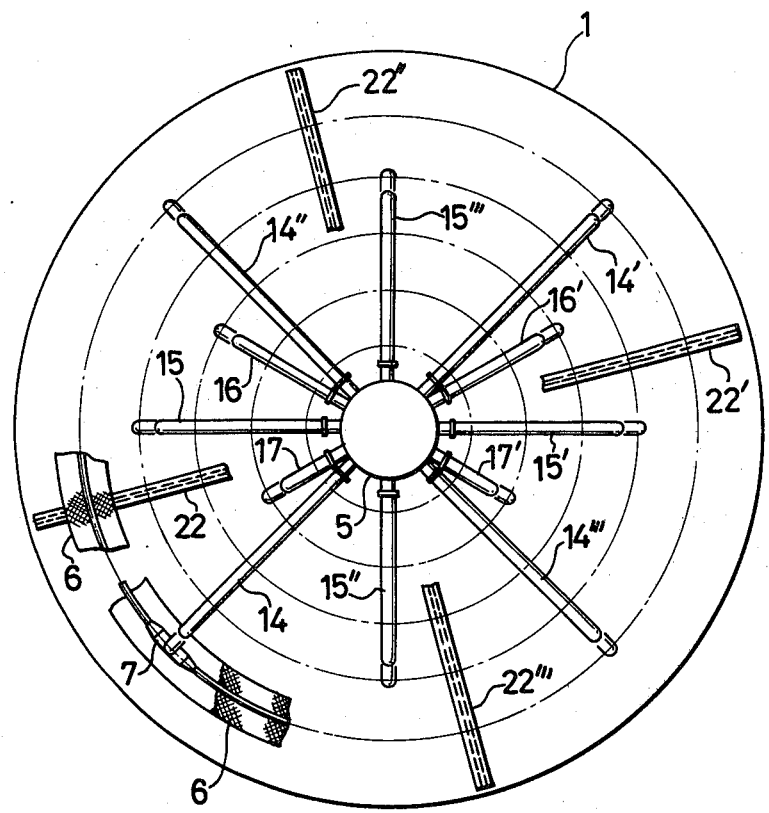
FIG. 2 is a plane view in horizontal cross section taken on line I—I of FIG. 1.

As shown in FIGS. 1 and 2, a main body 1 is provided with a gas inlet nozzle 2, a gas outlet nozzle 3 and an opening 4 for installing conduits to supply a part of a make-up gas for temperature control. In the center portion of the inside of the main body 1 there is provided a gas supply chamber 5 which is closed at one end and connected at other end to the opening 4 for installing conduits to supply a part of the make-up gas.

Inside the main body 1 are provided one or more stages of a set of gas injection rings 6, 6', . . . in the direction of the gas flow, the gas injection rings being installed in a single plane concentrically and perpendicularly to the direction of the gas flow. The gas injection rings preferably have a triangular cross section, the upper sides of which are inclined 45° to the horizontal plane, or a rhombic cross section, the upper sides of which are inclined similarly to the horizontal plane. The four edges of the gas injection rings consist of reinforcement material, and each side thereof is made of porous material of smaller mesh than the granular size of a catalyst or of a perforated plate to permit the free flow of gas into or out of the rings. Any known type of gas injection ring can be used. The gas injection rings incorporate gas sparging means 7, 7′, . . . inside themselves. The clearance between each of the gas injection rings 6, 6′, . . . is preferably as small as possible, but large enough to allow the passage of catalyst therein. The two axially spaced apart neighboring stages of the gas injection rings are arranged mutually staggered so that, for instance, the lower edge of each of the rings in the first stage is located between the upper edges of the two adjacent rings in the second stage as shown in FIG. 1. Thus a larger clearance is going to be left between the outermost ring and the inner wall of the main body or between the innermost ring and the outer wall of the gas supply chamber. In order to avoid increased gas flow through the area of the larger clearance mentioned above, the size of the outermost or the innermost ring in an alternate stage is made larger than the size of the other rings in the same stage as illustrated in FIG. 1.

The gas supply chamber 5 is divided into small chambers 10, 10′, 10″ by way of the partitions 9, 9′, 9″, the number of the which is same as that of stages of the gas injection tubes in the direction of the gas flow. The small chambers 10, 10′, 10″ are interconnected to the make-up gas supply conduits 11, 11′, 11″ respectively by connecting tubes 12, 12′, 12″. The connecting tubes 12, 12′, 12″ are provided with expansion joints 13, 13′, 13″ in the intermediate portions thereof in order to absorb the thermal expansion of the connecting tubes 12, 12′, 12″.

The small chambers 10, 10′, 10″ are interconnected to each of the gas sparging means incorporated in the gas injection tubes 6, 6′, . . . respectively by the connecting tubes 14, 14′, . . . , 15, 15′, . . . , 16, 16′, . . . , 17, 17′, . . . and 18, 18′, . . . A plurality of connecting tubes are provided for each of the gas injection rings in a stage.

A part of a make-up gas is introduced in the small chambers 10, 10′, 10″ through the make-up gas supply conduits 11, 11′, 11″ flows through the connecting tubes 14, 14′,, and is sparged upward from the gas sparging means 7, 7′, . . . into the gas injection rings 6, 6′, . . . The make-up gas thus sparged is thereafter mixed with gas, which is supplied through the gas inlet nozzle 2 and flows through a layer of catalyst into the gas injection rings 6, 6′, . . . , and after being temperature-controlled, enters the next layer of catalyst. The product gas, after passing through the catalyst layers, flows through a layer charged with alumina balls 20 and is collected into a perforated duct 21, and is expelled through a gas outlet conduit 3.

Each set of gas injection rings 6, 6′, . . . is supported by supporting beams 22, 22′, 22″, 22‴, 23, 23′, . . . or 24, 24′, . . . which are installed radially between the supporting structures provided on the outer wall of the gas supply chamber 5 and the inner wall of the main body 1. The supporting structures in this case need to be provided only at the small portions where the supporting beams are installed, and do not have to be provided circumferentially around the inner wall of the main body and the outer wall of the gas supply chamber.

The catalyst is charged and discharged through the duct 25 and the duct 26, respectively. The opening 27 is used for inspection of the inside of the main body.

The advantages of the present invention are described hereunder.

(1) A set of gas injection rings is interconnected to only one gas supply chamber, thus reducing the number of gas supply nozzles as installed in a prior art converter. The present invention makes the design, fabrication and transportation of a high pressure catalytic converter of a large size easier and at the same time improves the quality and reliability thereof.

(2) In a catalytic converter according to the present invention, wherein the supporting of the sets of the gas injection rings is made easy, the length of supporting beams becomes one half or less the diameter of the reactor vessel, since the groups of gas injection tubes are supported by a plurality of beams extending radially from the outer wall of the gas supply chamber to the inner wall of the main body. In prior art catalytic converters, supporting beams which are almost as long as the diameter of the catalytic converter must be used, requiring high rigidity of the beams. In a larger converter, the bigger supporting beams which must be provided either prevent a uniform gas flow or generate a deflected gas flow in the converter. On the contrary, shorter and slimmer supporting beams can be used even for a large-scale converter according to the present invention, and consequently the dead space in a catalyst layer is made smaller, rendering the use of a thinner catalyst layer possible. The difference between the pressure at the top and the pressure at the bottom of the catalyst bed becomes smaller thereby, eliminating the deviated gas flow in the catalyst layer. This is a great advantage for a large-size converter.

Additionally, the attaching structures for the supporting beams need to be provided only in the places where supporting beams are positioned, and therefore the problem of cracking of converter walls caused by the attaching structures of the prior art can be avoided.

(3) In a catalytic converter according to the present invention the gas supply chamber is arranged in the center portion of the converter and is so constructed that a part of a make-up gas is fed to each of the gas sparging means radially through connecting tubes, and therefore the volume occupied by tubing in the converter is minimized compared to converters of the prior art. This feature is magnified in a larger converter, and accordingly the total volume of a converter containing the same amount of catalyst can be made smaller than that of the converters of the prior art.

What is claimed is:

1. A catalytic converter which comprises:
 a converter shell having a make-up gas inlet port, a product gas outlet port, an opening and a plurality of gas supply conduits through which a part of the make-up gas is adapted to be fed for controlling the reaction temperature, said gas supply conduits being positioned in said opening in said shell;
 a single catalyst bed disposed in said converter shell;
 a hollow gas supply chamber disposed within said catalyst bed, said gas supply chamber being closed at one end thereof and in communication at the other end thereof with said opening for receiving said gas supply conduits therein;
 at least one stage of gas injection means comprising a plurality of gas injection rings which are disposed within said catalyst bed, said gas injection rings incorporating gas sparging means;

a plurality of beams which extend between and are secured to the inner surface of said converter shell and the outer surface of said gas supply chamber and which support said gas injection rings in said at least one stage, each of said beams being secured at one end to a point on said inner wall of said converter shell and at the other end to a point opposite thereto on said outer wall of said gas supply chamber;

at least one small chamber formed within said gas supply chamber, the number of said small chambers being equal to the number of the stages of said gas injection means;

elongated connecting means for interconnecting each of said small chambers to each of said gas supply conduits, said connecting means being installed inside said gas supply chamber; and connecting tubes for interconnecting each of said small chambers to each stage of said gas injection means.

2. A catalytic converter according to claim 1, wherein an expansion joint is provided in the intermediate portion of said connecting means.

3. A catalytic converter according to claim 1, wherein said small chamber is said gas supply chamber when the number of said small chambers is equal to one, and said small chambers are formed by dividing said gas supply chamber with at least one partition when the number of said small chambers is equal to more than one.

4. A catalytic converter according to claim 1, wherein each of said gas injection rings has a triangle cross section, the upper sides of which are inclined 45° to the horizontal plane.

5. A catalytic converter according to claim 4, wherein the edges of each of said gas injection rings is comprised of reinforcement material, and each side thereof is made of a gas-permeable porous material of smaller mesh than the granular size of the catalyst in said catalyst bed.

6. A catalytic converter according to claim 4, wherein the edges of each of said gas injection rings is comprised of reinforcement material, and each side is made of a perforated plate.

7. A catalytic converter according to claim 4, wherein there are a plurality of said gas injection rings axially spaced and wherein each two adjacent ones of said rings are staggered whereby the lower edge of the upper one of said rings is located between the upper edges of two adjacent rings in the lower one of said rings.

8. A catalytic converter according to claim 7, wherein the size of the outermost ring in one stage and the innermost ring in the next axially adjacent stage is larger than the remaining rings in their respective stages.

9. A catalytic converter according to claim 1 wherein each of said gas injection rings has a rhombic cross section, the upper sides of which are inclined 45° to the horizontal plane.

10. A catalytic converter according to claim 9, wherein the edges of each of said gas injection rings is comprised of reinforcement material, and each side thereof is made of a gas-permeable porous material of smaller mesh than the granular size of the catalyst in said catalyst bed.

11. A catalytic converter according to claim 9, wherein the edges of each of said gas injection rings is comprised of reinforcement material, and each side is made of a perforated plate.

12. A catalytic converter according to claim 9, wherein there are a plurality of said gas injection rings axially spaced apart and wherein each two adjacent one of said rings are staggered whereby the lower edge of the upper one of said rings is located between the upper edges of two adjacent rings in the lower one of said rings.

13. A catalytic converter according to claim 12, wherein the size of the outermost ring in one stage and the inner most ring in the next axially adjacent stage is larger than the remaining rings in their respective stages.

14. A catalytic converter according to claim 1, wherein said gas supply chamber is positioned in the center portion of the inside of said converter shell.

15. A catalytic converter according to claim 1, wherein said at least one stage of said gas injection means is positioned concentrically with and perpendicularly to the make-up flow.

16. A catalytic converter according to claim 1, wherein said beams are arranged radially with respect to said converter shell and said gas supply chamber.

* * * * *